United States Patent
Lai et al.

(10) Patent No.: US 7,992,124 B2
(45) Date of Patent: Aug. 2, 2011

(54) SYSTEM AND METHOD FOR OPTIMIZING ANALOG CIRCUIT DESIGNS

(75) Inventors: Ying-Tso Lai, Taipei Hsien (TW); Tsung-Sheng Huang, Taipei Hsien (TW); Shou-Kuo Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 422 days.

(21) Appl. No.: 12/257,366

(22) Filed: Oct. 23, 2008

(65) Prior Publication Data
US 2010/0050136 A1  Feb. 25, 2010

(30) Foreign Application Priority Data
Aug. 20, 2008  (CN) .......................... 2008 1 0304073

(51) Int. Cl.
*G06F 17/50* (2006.01)
*G06F 9/455* (2006.01)

(52) U.S. Cl. ........ 716/132; 716/100; 716/101; 716/102; 716/106; 716/110; 716/112; 716/113; 716/133; 716/134

(58) Field of Classification Search .......... 716/100–102, 716/106, 110–113, 132–134
See application file for complete search history.

(56) References Cited

U.S. PATENT DOCUMENTS

| | | | |
|---|---|---|---|
| 6,807,652 B2 * | 10/2004 | McConaghy | 716/132 |
| 7,293,248 B2 * | 11/2007 | Chang et al. | 716/108 |
| 7,484,194 B2 * | 1/2009 | Gregory et al. | 716/113 |
| 7,552,406 B2 * | 6/2009 | Johnson et al. | 716/106 |

* cited by examiner

*Primary Examiner* — Nghia M Doan
(74) *Attorney, Agent, or Firm* — Zhigang Ma

(57) ABSTRACT

A system for optimizing analog circuit designs includes an input device, a data processing device, and a data storage device. The data processing device includes a selecting module, a calculation module, and a determining module. The selecting module is for receiving input from the input device and selecting electronic components composing the circuit from the data storage device. The calculation module is for calculating average values and standard deviations of each electronic component, generating normal distribution samples of each electronic component, and calculating output voltages of the circuit. The determining module is for determining whether the circuit meets a process capability standard.

15 Claims, 4 Drawing Sheets

SYSTEM AND METHOD FOR OPTIMIZING ANALOG CIRCUIT DESIGNS

BACKGROUND

1. Technical Field

The present disclosure relates to circuit optimizing systems and methods, and in particular, to a system and method for optimizing analog circuit designs to ensure the designed circuit to meet a desired process capability standard.

2. Description of Related Art

Reliability of a circuit depends on different electronic components composing the circuit, such as resistors, capacitors, comparators, etc. If temperature, humidity, air pressure or other factors change, many parameters of the electronic components may change as well, such as output voltages. If these factors are not taken into account, the output voltages of the circuit may exceed a standard voltage range, and the reliability of the circuit and the circuit process capability will be reduced.

Therefore, it is desired to provide a system and a method for optimizing analog circuit designs to overcome the above described shortcomings.

DETAILED DESCRIPTION

Figure 1:
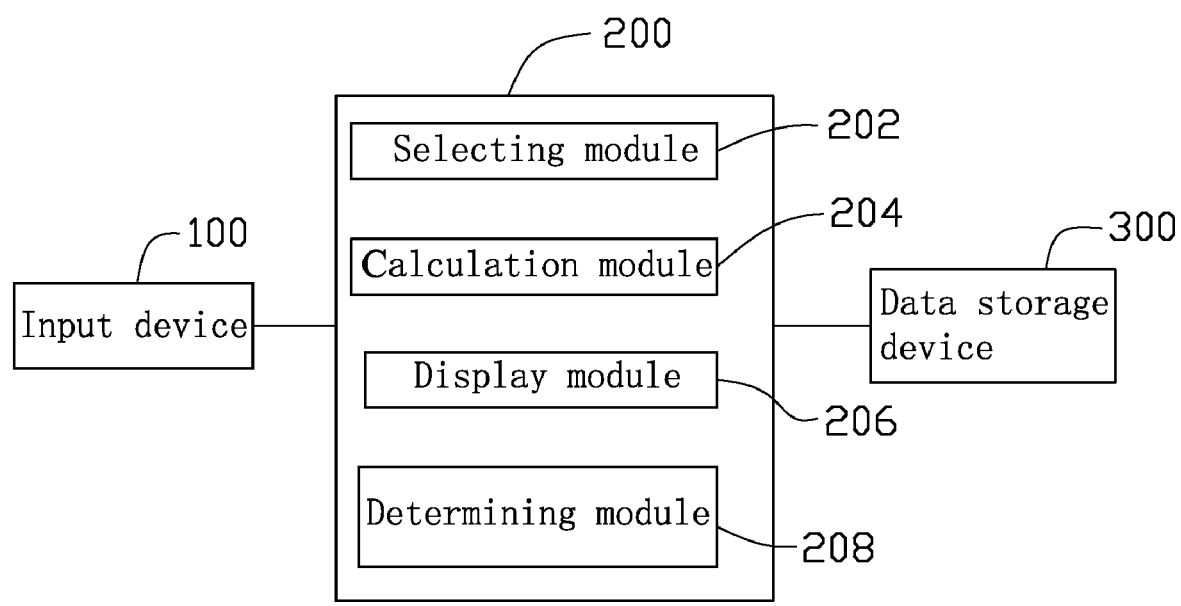
FIG. 1 is a block diagram of an exemplary embodiment of a system for optimizing analog circuit designs.

Referring to FIG. 1, an exemplary embodiment of a system 10 for optimizing analog circuit designs includes an input device 100, a data processing device 200, and a data storage device 300. The data processing device 200 includes a selecting module 202, a calculation module 204, a display module 206, and a determining module 208. The modules 202, 204, 206 and 208 may be used to execute one or more operations for the data processing device 200.

The input device 100 can be a keyboard, a mouse, and so on. The input device 100 is configured for inputting a target output voltage of a circuit, a formula for calculating output voltage of the circuit, and electronic components composing the circuit such as resistors, capacitors, or voltage regulators. In one example, the target output voltage of a circuit may be 2 volts, electronic components composing the circuit can be two resistors, and a power supply, the formula for calculating output voltage of the circuit can be $$vou = \frac{vi}{k1+k2} * k1,$$

where vi, k1, k2 are the three electronic component values.

The data processing device 200 is configured for processing input from the input device 100. In this embodiment, the data processing device 200 is a computer, but the disclosure is not limited thereto. The data storage device 300 includes a database communicating with the data processing device 200 via a database connectivity, such as an Open Database Connectivity (ODBC) or a Java Database Connectivity (JDBC). The database stores a list of a plurality of electronic components, primary electronic component values, and relative errors associated with those electronic components under different environments. In one example, a primary electronic component value can be 10 ohms if the electronic component is a resistor and a relative error can be 1% under an a specific environment, thus the electronic component value under this environment can be 10+10*1%=10.01 ohms.

The selecting module 202 is configured for receiving input from the input device 100, and for selecting the electronic components composing the circuit from the database of the data storage device 300 based on the input.

The calculation module 204 is configured for calculating average values and standard deviations of each electronic component based on the primary values and the relative errors. It may be understood that an average value of an electronic component is equal to the sum of different values under different environments divided by the count of environments, then the standard deviation value of the electronic component can be calculated using a standard deviation mathematics formula. Then the calculation module 204 generates normal distribution samples of each electronic component based on the average values and the standard deviations, and calculates output voltages of the circuit based on the normal distribution samples and the formula for calculating output voltage.

The display module 206 is configured for displaying a normal distribution diagram based on the calculated output voltages to a viewing display such as a monitor.

The determining module 208 is configured for calculating a first process capability index and a second process capability index based on the calculated output voltages. In one exemplary example, the first process capability index is obtained from $$Cp = \frac{Usl - Lsl}{6 * \sigma},$$

the second process capability index is obtained from $$Cpk = \min\left\{\frac{Usl - u}{3 * \sigma}, \frac{u - Lsl}{3 * \sigma}\right\}, \sigma$$

is obtained from $$\sigma = \sqrt{\frac{\sum_{i=1}^{n}(x_i - u)^2}{n-1}},$$

where n is the count of the output voltages, u is an average of the output voltages, $x_i$ is output voltage values, Ut is the target output voltage. A difference between the Us1 and Ut is equal to 5% of the Ut. A difference between the Ls1 and the Ut is equal to 5% of the Ut. If the target output voltage is 3 volts, Us1=3+3*5%=3.15 volts, Ls1=3−3*5%=2.85 volts. If the first and second process capability indexes are equal to or greater than a process capability standard, the circuit meets or exceeds the desired process capability standard. If one of the first and second process capability indexes is less than the process capability standard, the circuit does not meet the desired process capability standard.

Figure 2:
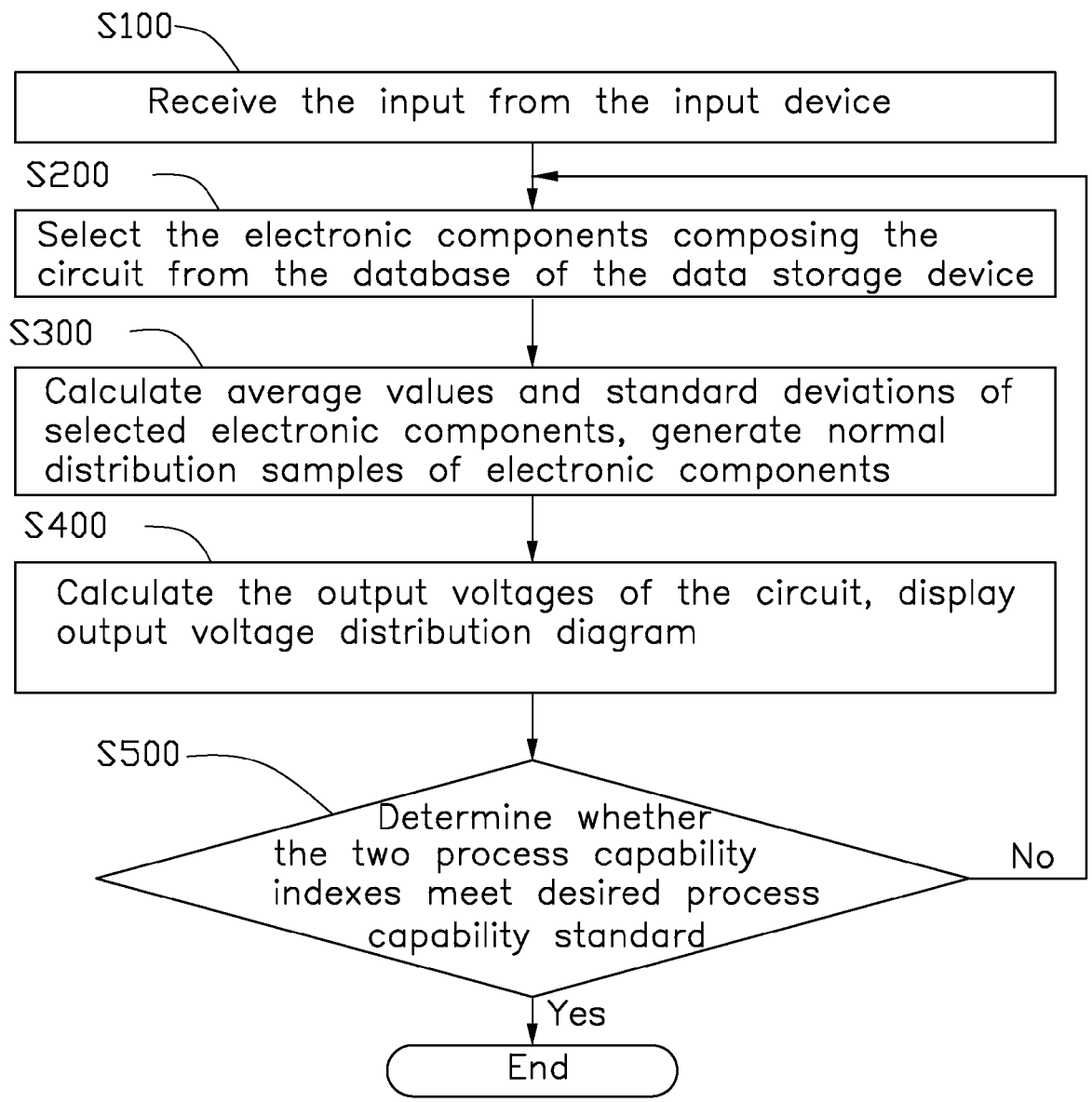
FIG. 2 is a flowchart of an exemplary embodiment of a method for optimizing analog circuit designs.

Referring to FIG. 2, an exemplary embodiment of a method for optimizing analog circuit designs includes the following blocks described below. Depending on the embodiment, certain of blocks described below may be removed, others may be added, and the sequence of blocks may be altered.

In block S100, the selecting module 202 of the data processing device 200 receives the input from the input device 100, the input includes a target output voltage of the circuit, a formula for calculating output voltage of the circuit, and electronic components composing the circuit.

In block S200, the selecting module 202 selects the electronic components composing the circuit from the database of the data storage device 300 based on the input.

In block S300, the calculation module 204 calculates average values and standard deviations of each electronic component based on the primary values and the relative errors, generates normal distribution samples of each electronic component based on the average values and the standard deviations.

In block S400, the calculation module 204 calculates output voltages of the circuit based on each normal distribution sample and the formula for calculating output voltage of the circuit. The display module 206 displays a voltage distribution diagram based on the calculated output voltages.

In block S500, the determining module 208 calculates first and second process capability indexes, determines whether the first and second process capability indexes meet the desired process capability standard. The circuit meets the desired process capability standard if the first and second process capability indexes are equal to or greater than the process capability standard. The circuit does not meet the desired process capability standard if one of the first and second process capability indexes is less than the process capability standard, the procedure returns to block S200 described above.

Figure 3:
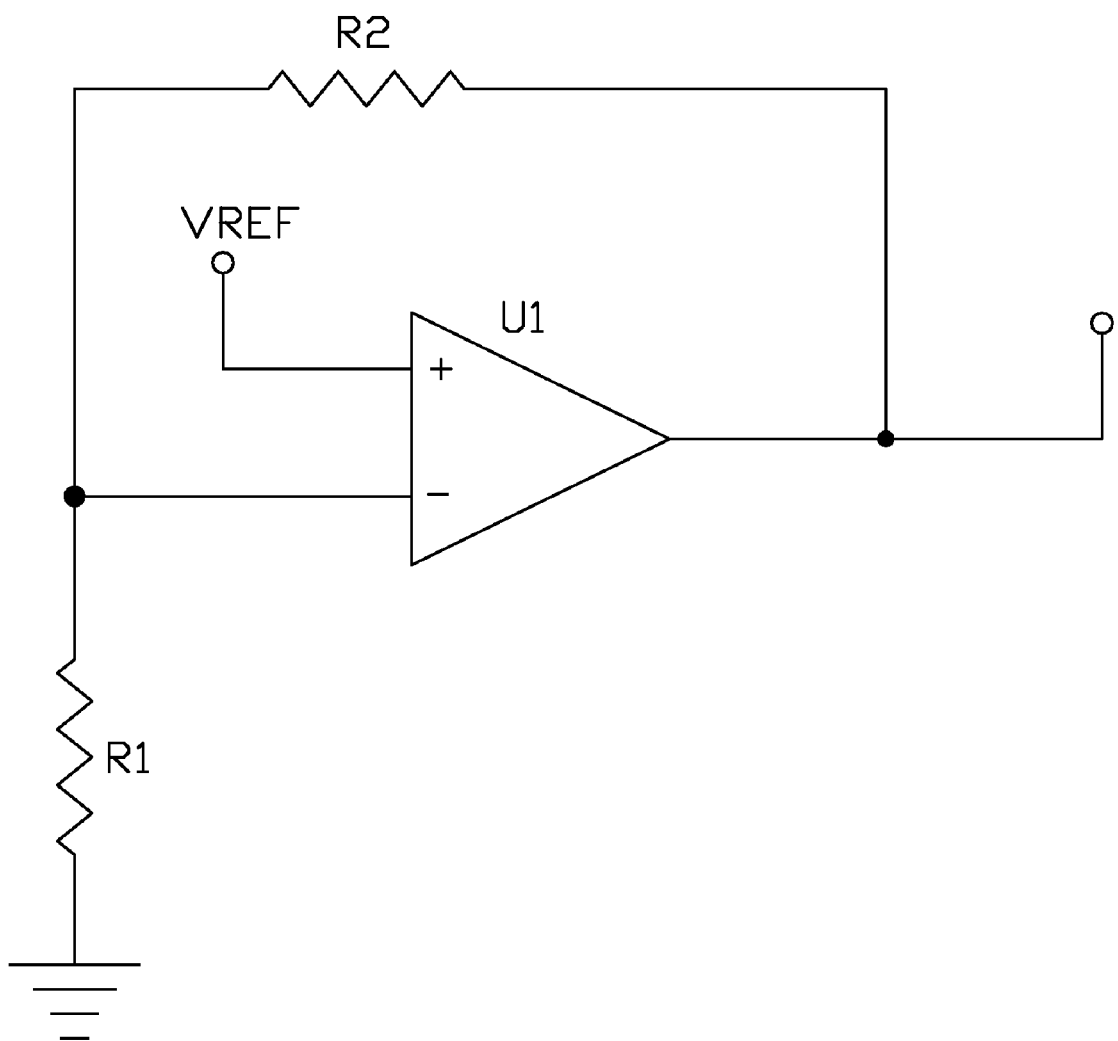
FIG. 3 is a schematic diagram of one example of a circuit that may be analyzed using the system of the present disclosure.

Referring to FIG. 3, a schematic diagram of one example of a circuit that may be analyzed using the system of the present disclosure includes a resistor R1, a resistor R2, and a comparator U1. A non-inverting input terminal of the comparator U1 is connected to a reference power supply VREF. An output terminal of the comparator U1 is connected to the ground via the resistors R2 and R1. An inverting input terminal of the comparator U1 is connected to a node between the resistors R1 and R2. It may be appreciated that the circuit 30 is exemplary and other circuits may also be used without departing from the spirit of the present disclosure.

The data processing device 200 receives input from the input device 100 including a 1.5 volt target output voltage, two resistors, a comparator, a formula for calculating output voltage of the circuit 30. The formula for calculating output voltage of the circuit 30 is Vout=vref*(1+r2/r1), where r1, r2 are the resistances of the resistors R1 and R2, vref is voltage of the reference power supply VREF (see block S100).

Based on the requirement electronic components, the target output voltage, and the formula for calculating output voltage of the circuit 30, the selecting module 202 selects a resistor R1 of 2320 ohms, a resistor R2 of 2100 ohms, a comparator U1 with a reference power supply VREF of 0.8 volts from the database of the data storage device 300 preliminarily (see block S200).

The data storage device 300 stores relative errors of resistance of the resistors R1, R2, and relative errors of voltage of the reference power supply VREF under different environments showing in table 1. If standard deviations of the resistance r1, the resistance r2, and the voltage vref are σ1, σ2, σ3; and average values of the resistance r1, the resistance r2, and the voltage vref are u1, u2, u3; the relative errors of the resistance r1, the resistance r2, and the voltage vref under different environments are $m_i$, $n_i$, $b_i$ shown in table 1, $$\sigma 1 = r1 * \sqrt{\frac{\sum_{i=1}^{n}(m_i)^2}{n-1}}, \sigma 2 = r2 * \sqrt{\frac{\sum_{i=1}^{n}(n_i)^2}{n-1}}, \sigma 3 = vref * \sqrt{\frac{\sum_{i=1}^{n}(b_i)^2}{n-1}}.$$

E.g. the calculation module 204 can prescribe an average value of the resistance r1=2320 ohms, an average value of the resistance r2=2100 ohms, and an average value of the reference voltage vref=0.8 volts, n is the count of the environment as shown in table 1, so a standard deviation of the resistance σ1=15.025 ohms, a standard deviation of the resistance σ2=14.616 ohms, and a standard deviation of the reference voltage σ3=2.667 mV, then generates the normal distribution samples of the resistance r1, the resistance r2, and the voltage vref based on the average values and standard deviations. In this embodiment, the count of the normal distribution samples of each the three value (r1, r2, vref) is 10,000, and each sample of the three value comprises a team. E.g. r1=2320 ohms, 2319 ohms, 2322 ohms . . . , r2=2100 ohms, 2106 ohms, 2105 ohms . . . , vref=0.8 volts, 0.82 volts, 0.86 volts, . . . , the teams are (2320 ohms, r2=2100 ohms, 0.8 volts), (2319 ohms, r2=2106 ohms, 0.82 volts), 2322 ohms, r2=2105 ohms, 0.86 volts), etc (see block S300).

TABLE 1 relative errors of electronic components under different environments

| Environment | Relative error of R2 (mi) | Relative error of R1 (ni) | Relative error of Vref(bi) |
|---|---|---|---|
| Factory | 1.0% | 1.0% | 1.0% |
| Temperature change | 0.6% | 0.6% | 0 |
| Aging | 1.0% | 0.75% | 0 |
| Welding | 0.5% | 0.2% | 0 |
| Temperature cycle | 0 | 0.75% | 0 |
| Humidity | 0.5% | 0.5% | 0 |
| Low-temperature | 0.5% | 0.5% | 0 |
| High-temperature | 0 | 0.5% | 0 |
| Thermal | 1.0% | 0.5% | 0 |
| Thermal shock | 0.5% | 0.5% | 0 |

Figure 4:
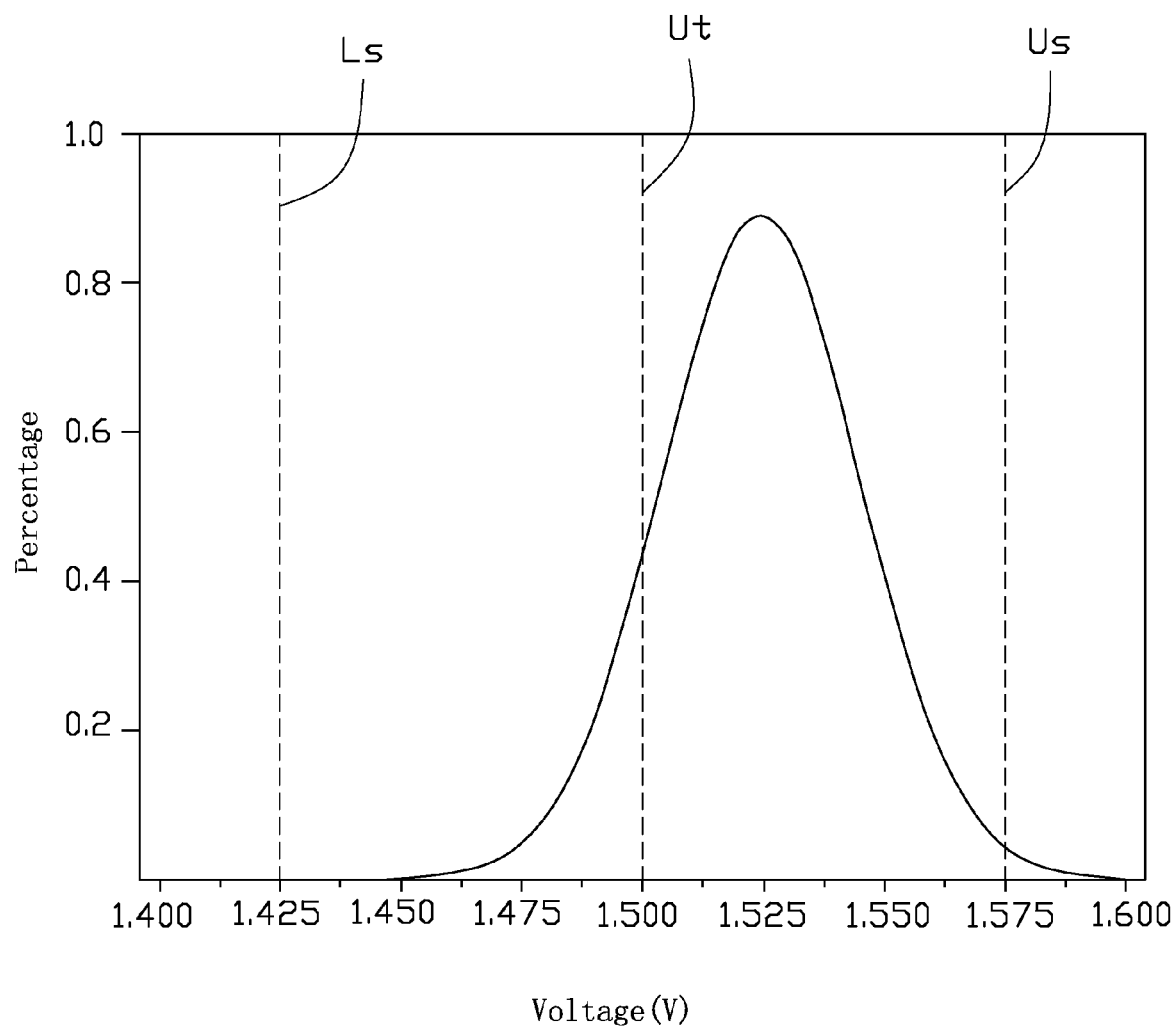
FIG. 4 is one example of an output voltage distribution diagram of the circuit of FIG. 3.

Referring to FIG. 4, the calculation module 204 calculates the output voltages of the circuit 30 based on the output voltage formula Vout=vref*(1+r2/r1) and each team, then the 10000 values of the output voltage Vout of the circuit 30 are obtained. The display module 206 receives the calculated output voltages Vout of the circuit 30 and displays an output voltage distribution diagram. A horizontal ordinate of the output voltage distribution diagram indicates the calculated output voltages of the circuit 30, a longitudinal ordinate indicates percentages of the different calculated voltage count of the total calculated output voltage count, e.g. a horizontal ordinate is 1.5 volts, the count of the 1.5 volt output voltage is 4400, the total output voltage is 10000, the longitudinal ordinate is 4400/10000=0.44. In FIG. 4, Ut is the target output voltage Vout being 1.5 volts, Us is an up threshold voltage of the output voltage Vout, and Ls is a down threshold voltage of the output voltage Vout, where Us=Ut+Ut*5%=1.5+1.5*5%=1.575 volts, Ls=Ut−Ut*5%=1.5−1.5*5%=1.425 volts (see block S400).

The determining module 208 calculates a first process capability index Cp and a second process capability index Cpk based on formulas $$Cp = \frac{Us - Ls}{6*\sigma}, Cpk = \min\left\{\frac{Us - u}{3*\sigma}, \frac{u - Ls}{3*\sigma}\right\}, \text{ and } \sigma = \sqrt{\frac{\sum_{i=1}^{n}(x_i - u)^2}{n - 1}},$$

Ut=1.5 volts, Us=1.575 volts, Ls=1.425 volts, n is the count of the output voltage, xi is the output voltage values, u is the average value of the output voltage values. The first process capability index Cp is equal to or greater than the process capability standard, indicating the output voltage of the circuit 30 is more precise. The second process capability index Cpk is greater and closer to the first process capability index Cp, indicating the output voltage Vout is near to the target voltage Ut and the circuit 30 is more reliable. Generally, the process capability standard is specified 1.33, that is, the first and second process capability indexes Cp and Cpk meet Cp>1.33, Cpk>1.33 (see block S500). If one of the first and second process capability indexes is less than 1.33, the determining module 208 will select electronic components composing the circuit 30 again and repeats blocks S200-S500, until the first and second process capability indexes Cp and Cpk meet Cp>1.33 and Cpk>1.33.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A system for optimizing analog circuit designs, comprising:
    an input device configured for inputting a target output voltage of a circuit, a formula for calculating output voltage of the circuit, and electronic components composing the circuit;
    a data storage device configured for storing a list of a plurality of electronic components, primary electrical values of each electronic component, and specified environment relative errors of each electronic component; and
    a data processing device comprising:
        a selecting module configured for receiving input from the input device, and selecting electronic components composing the circuit from the list in the data storage device;
        a calculation module configured for calculating average values and standard deviations of each selected electronic component based on the primary electrical values and the relative errors of each selected electronic component, generating normal distribution samples of each electronic component based on the average values and the standard deviations, and calculating output voltages of the circuit based on each normal distribution sample and the formula for calculating output voltage of the circuit; and
        a performance determining module configured for calculating first and second process capability indexes based on the output voltages of the circuit, determining whether the first and second process capability indexes meet a desired process capability standard, wherein the circuit meets the desired process capability standard upon a condition that the first and second process capability indexes are equal to or greater than a process capability standard that indicates the output voltage closed to the voltage target, and wherein the circuit does not meet the desired process capability standard upon a condition that one of the indexes is less than the process capability standard.

2. The system of claim 1, wherein the input device is a keyboard, wherein a target output voltage, the formula for calculating the output voltage, and the electronic components composing the circuit are input into the data processing device by operation of the keyboard.

3. The system of claim 1, wherein the input device is a mouse, wherein a target output voltage, a formula for calculating the output voltage, and electronic components composing the circuit are input into the data processing device by clicking the mouse.

4. The system of claim 1, wherein the data storage device communicates with the data processing device via a database connectivity.

5. The system of claim 4, wherein the database connectivity is an Open Database Connectivity (ODBC).

6. The system of claim 4, wherein the database connectivity is a Java Database Connectivity (JDBC).

7. The system of claim 1, wherein the system further comprises a display module configured for receiving the calculated output voltages of the calculation module to display an output voltage distribution diagram of the circuit.

8. The system of claim 7, wherein a horizontal ordinate of output voltage distribution diagram indicates output voltages of the circuit, a longitudinal ordinate indicates percentages of the different output voltage count of the total output voltage count.

9. A method for optimizing analog circuit designs, comprising:
    inputting a target output voltage of the circuit, a formula for calculating output voltage of the circuit, and electronic components composing the circuit by an input device;
    selecting electronic components composing the circuit that associates with a primary electrical values and specific environment relative errors from list stored in a data storage device based on the input;
    calculating average values and standard deviations of each electronic component based on the primary electrical values and the relative errors of each electronic component, generating normal distribution samples of each electronic component based on the average values and the standard deviations;
    calculating output voltages of the circuit based on each normal distribution sample and the formula for calculating the output voltage of the circuit; and
    calculating a first and a second process capability indexes based on the output voltages, determining whether the first and second process capability indexes meet a desired process capability standard, wherein the circuit meets the desired process capability standard upon a condition that the first and second process capability indexes are equal to or greater than a process capability standard that indicates the output voltage closed to the voltage target, wherein the circuit does not meet the desired process capability standard upon a condition that one of the first and second process capability indexes is less than the process capability standard, the procedure returns to block of selecting electronic components composing the circuit from the data storage device.

10. The method of claim 9, wherein the input device is a keyboard, a target output voltage, a formula for calculating output voltage, and electronic components composing the circuit are input into the data processing device by operation of the keyboard.

11. The method of claim 9, wherein the input device is a mouse, a target output voltage, a formula for calculating output voltage, and electronic components composing the circuit are input into the data processing device by clicking the mouse.

12. The method of claim 9, wherein the data storage device comprises a database.

13. The method of claim 9, wherein the database storing primary electrical values, and relative errors under different environments of the electronic components.

14. The method of claim 9, further comprising: displaying an output voltage distribution diagram of the circuit based on calculated output voltages.

15. The method of claim 14, wherein a horizontal ordinate of output voltage distribution diagram indicates output voltages of the circuit, a longitudinal ordinate of output voltage distribution diagram indicates percentages of the different voltage count of the total output voltage count.

* * * * *